H. D. CHURCH.
MOTOR VEHICLE.
APPLICATION FILED DEC. 7, 1912.
1,238,105.
Patented Aug. 28, 1917.
4 SHEETS—SHEET 4.
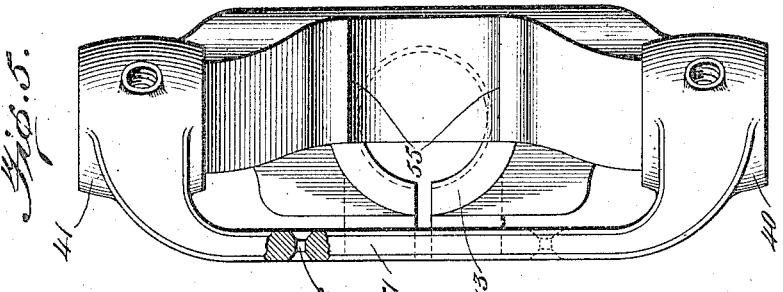
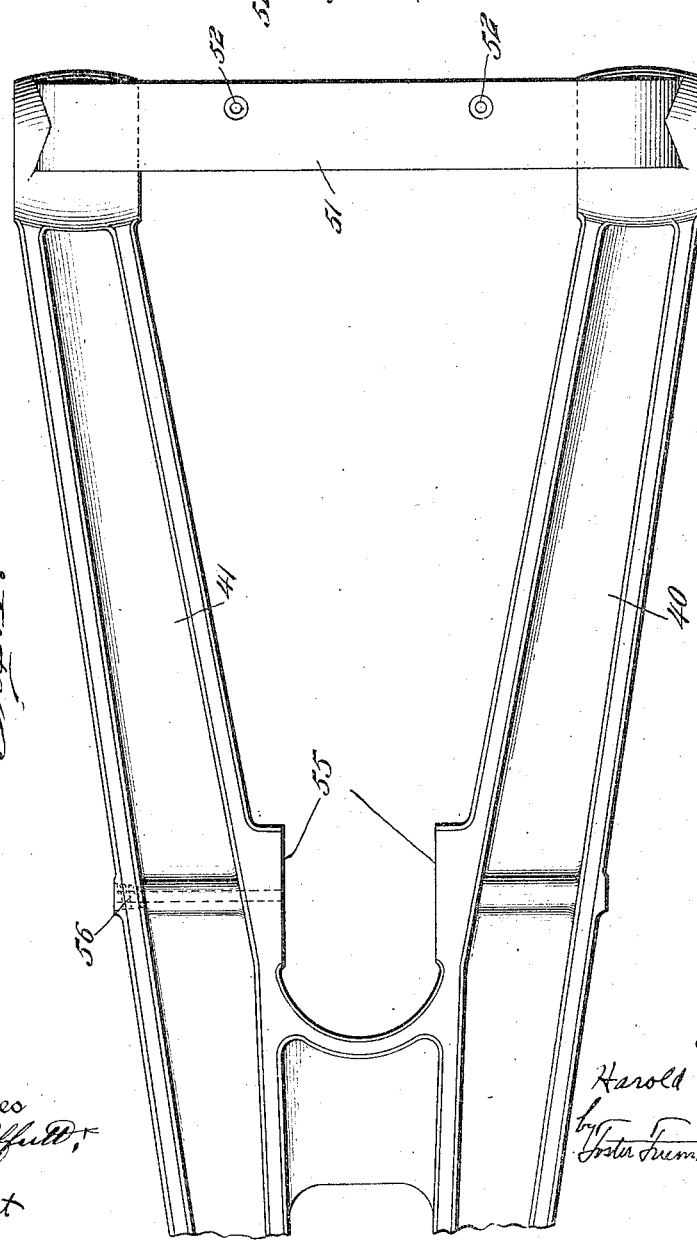
Witnesses
B. M. Offutt
B. M. Kent
Inventor
Harold D. Church
by Foster Freeman Watson Hort
Attorneys

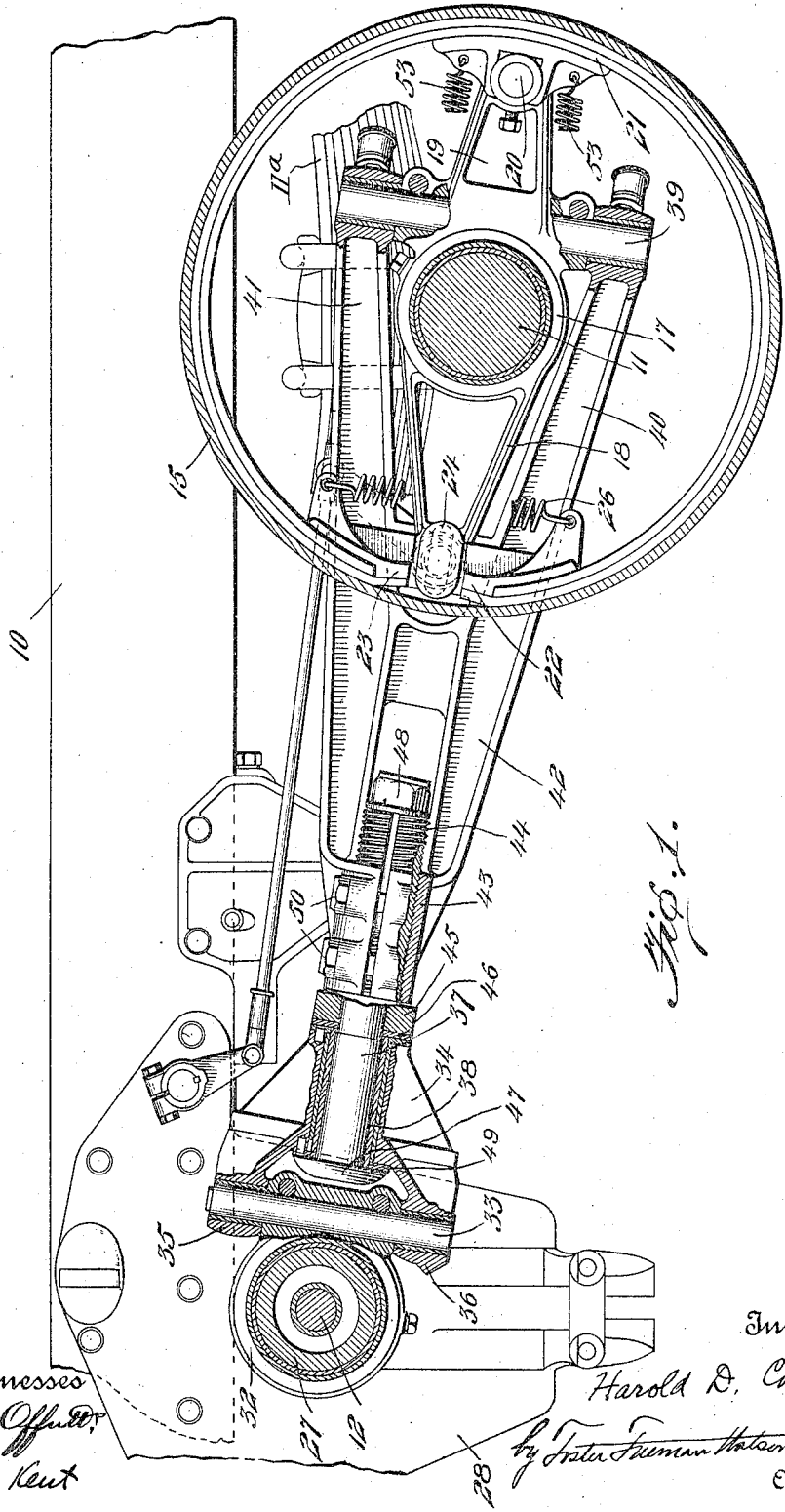

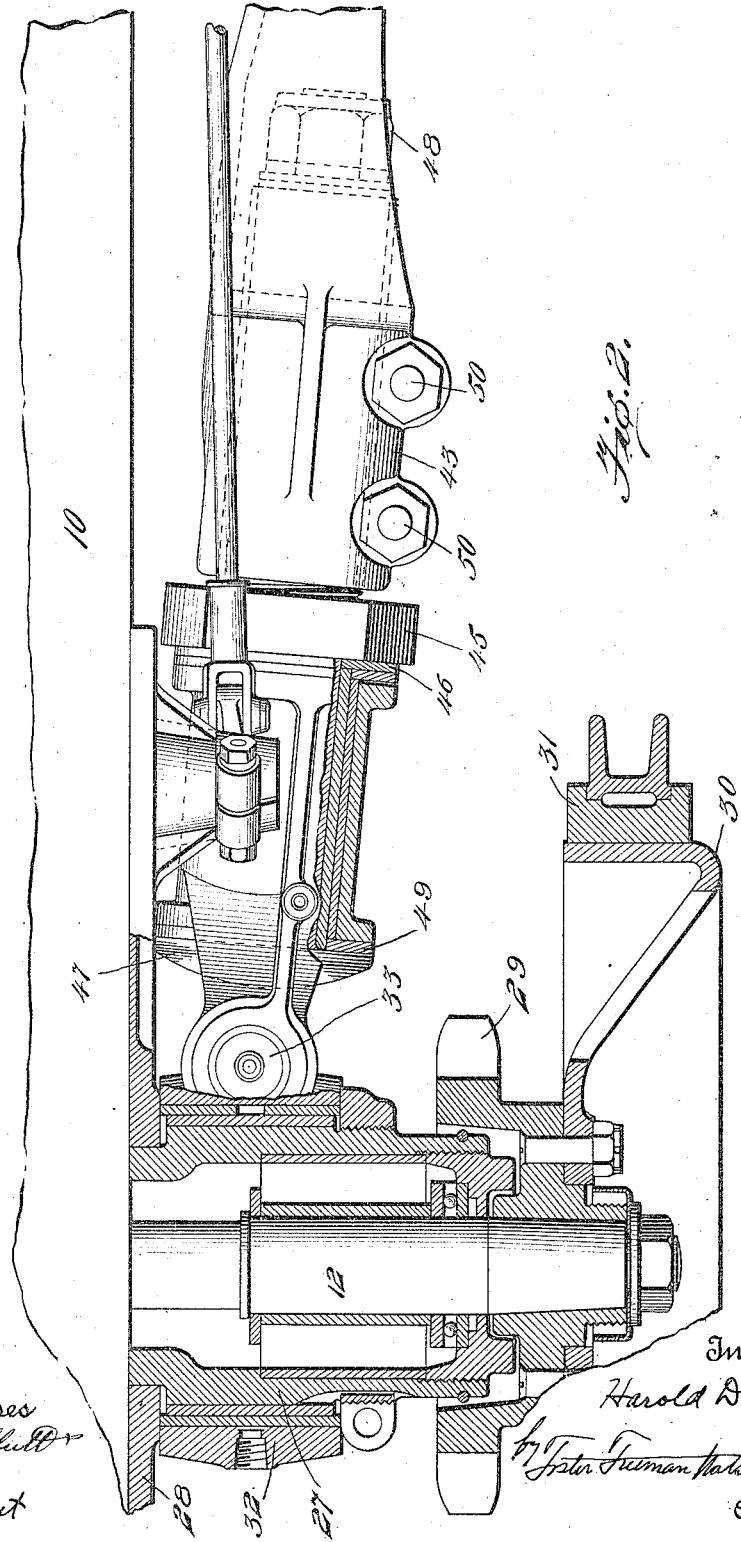

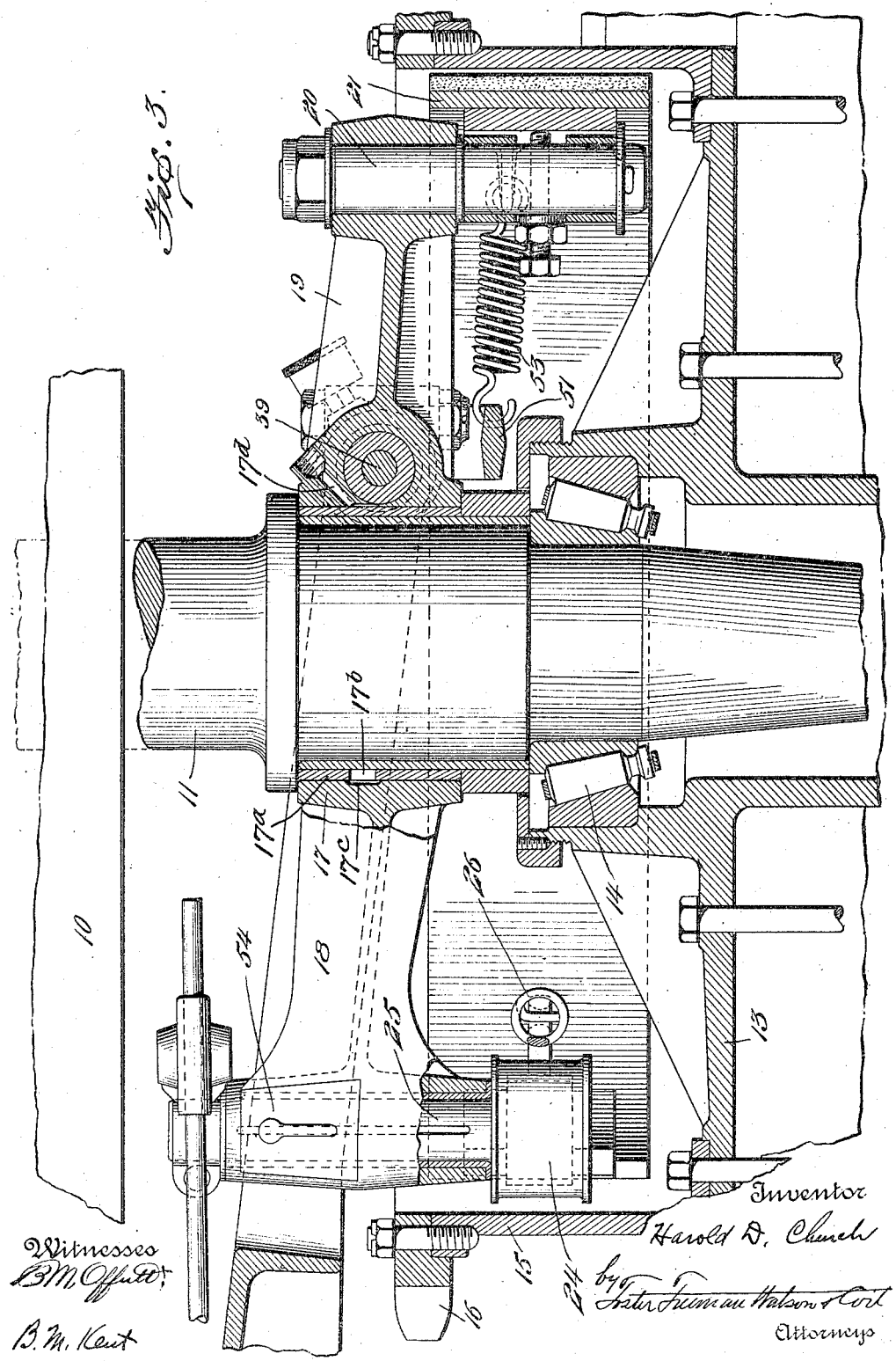

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,238,105.   Specification of Letters Patent.   Patented Aug. 28, 1917.

Application filed December 7, 1912. Serial No. 735,560.

*To all whom it may concern:*

Be it known that I, HAROLD D. CHURCH, a citizen of the United States, residing at Detroit, Wayne county, State of Michigan, have invented certain new and useful Improvements in Motor-Vehicles, of which the following is a specification.

This invention relates to motor vehicles and more particularly to improvements in the construction and arrangement of the brace or distance rod and its connections with the frame and axle.

The invention is particularly applicable to heavy commercial vehicles such as three and five ton trucks which are mounted on wheels having solid rubber tires. It is essential in such vehicles that the driving and braking parts be made very sturdy and that provision be made for taking up wear and for cheaply replacing worn parts. One of the objects, therefore, of the present invention is to so design the brace or distance rod that it will be inexpensive to manufacture, and in which the strains will be most effectively distributed so as to produce the minimum liability of fracture. Another object of the invention is to so construct the parts as to provide a strong flexible connection between the axle and the frame of the vehicle which will withstand the racking and twisting strains to which they are constantly subjected, and in which adjustment for wear may be readily made and the wearing parts easily and cheaply replaced.

Other objects and the features of novelty will be apparent from the following description taken in connection with the accompanying drawings in which—

Figure 1 is a side elevation of a portion of a vehicle embodying the invention, certain parts being shown in section;

Fig. 2 is an enlarged plan view of the parts shown at the left hand end of Fig. 1, certain parts being shown in section;

Fig. 3 is a similar view of certain parts shown at the right hand end of Fig. 1;

Fig. 4 is an enlarged side elevation of the rear portion of the radius rod; and

Fig. 5 is an end elevation of the part shown in Fig. 4.

Referring to the drawings, 10 indicates the usual frame of the vehicle which is flexibly supported on the rear axle 11 by means of the usual springs, a portion of one of which is shown at 11ª. The axle 11 has arranged thereon the usual wheels, a portion of the hub of one of which is shown at 13, this hub being mounted on roller bearings, one of which is shown at 14. The wheels have secured to their inner sides the brake drums 15 and driving sprockets 16 may be secured to the brake drums, although any other arrangement of the driving sprockets may be used. Secured against lateral movement on the axle 11 adjacent the inner side of each of the wheels is a sleeve or spider 17 having the forwardly projecting arm 18 and the rearwardly projecting arm 19. The sleeve 17 is trunnioned on the axle and in order to reduce the wear due to the movement of the sleeve to a minimum, the sleeve is provided with a bushing 17ª and the bearing surfaces are lubricated through one or more openings 17ᵇ which are supplied from an annular groove 17ᶜ, the latter being, in turn, supplied through the passage 17ᵈ. The arm 19 carries a pin 20 on which is mounted the brake shoe 21, this brake shoe being arranged on the interior of the brake drum 15 and having the free ends 22 and 23 between which is arranged the usual spreading or actuating cam 24. The particular means for mounting the brake shoe on the arm 19 and the particular means for actuating the brake may be of any preferred construction. The actuating cam 24 is preferably arranged on a shaft 25 carried by the arm 18. The free ends 22 and 23 of the brake band 21 are drawn together by means of the spring 26 so as to hold the brake shoe out of contact with the brake drum.

The jack or driving shaft 12 is mounted in suitable bearing members 27, carried by brackets 28 mounted on the frame 10, and carries a sprocket 29 which is in line with the sprocket 16 and drives the latter by means of a suitable chain. The shaft 12 may also have secured thereto a brake drum 30 having a suitable brake 31 arranged to contact with its outer surface.

Surrounding the bearing member 27 and adapted to rock thereon is a collar or sleeve 32 which carries a substantially vertical pivot pin 33. A casting 34 having its forward end forked to provide the arms 35 and 36 which engage the pin 33 has a bore extending longitudinally of the vehicle to provide a bearing for the pin or bolt 37, this bearing being lined with a suitable bushing 38.

The sleeve 17 carries a pivot pin 39 which is arranged substantially parallel to the pin 33 and has connected therewith the arms 40 and 41, of the casting 42, which embrace the axle 11 and extend forwardly and unite to form a split collar or hub 43. The castings 34 and 42 and their connecting parts constitute a frame and axle connecting member or brace or radius rod and as shown this member transmits the thrust from the rear axle to the frame of the vehicle.

The pin or bolt 37 extends through the split collar 43, the latter being provided on its interior with an exteriorly threaded sleeve 44 which engages the threaded interior of the collar and is provided at one end with the flange 45 between which and the rearward end of the casting 34 is arranged a thrust bearing, this thrust bearing being provided with a renewable washer or thrust ring 46. The bolt 37 has at its forward end the head 47 and at its rearward end the nut 48, the former bearing on a suitable thrust ring 49 arranged at the forward end of the casting 34 and the latter bearing against the rearward end of the threaded sleeve 44. As will be readily observed from Fig. 1, the forward portion of the bolt 37 is slightly larger than the rearward portion, this arrangement permitting the parts to be readily assembled and disassembled.

It will be obvious from the drawings, the pivot pins 33 and 39 being in vertical planes extending longitudinally of the vehicle permit lateral swaying of the frame 10 relative to the axle 11, and the connection between the parts 34 and 42 of the brace rod permit the swiveling of one part relative to the other. The arrangement of the collar 32 on the bearing member 27 permits the sleeve to rock on the member 27 and this rocking movement combined with the swiveling of the parts of the brace rod and the lateral swinging of the brace rod on the pivot pins 33 and 39 provides universal movement which will accommodate all twisting and swaying of the body and axle.

It will be observed that the bolt 37 has long bearings in the castings 34 and 42 thus providing a substantially rigid brace rod.

For the purpose of taking up wear of the thrust rings 46 and 47 the sleeve 44 may be turned in the collar 43 and the nut 48 may be adjusted on the bolt 37. The parts of the split collar 43 are clamped on the sleeve 44 by means of their bolts 50.

For the purpose of rigidly securing the ends of the arms 40 and 41, of the casting 42, together I have provided the bar 51, which is preferably formed integral with the ends of the arms 40 and 41 and arranged substantially parallel with the pin 39. The bar 51 is provided with openings 52 which receive the forward ends of the springs 53, the rearward ends of these springs being connected with the brake shoe 21 and drawing the latter forwardly away from the brake drum.

When the vehicle is in motion and the brake is applied to the drum 15 there is a tendency for the shoe 21 to rotate with the wheel, this rotation being prevented by the band and the arms connections between the band and the arms 18 and 19. In order to prevent the sleeve 17 from rotating on the shaft 11 I have arranged the forward end of the arm 18 between the arms 40 and 41 of the rearward casting 42 of the brace rod and provided the arm 18 on its upper and lower sides with bearing surfaces 54 which engage coöperating surfaces 55 on the arms 40 and 41. The bearing surfaces 54 of the arm 18 are free to move laterally on the surfaces 55 and therefore do not interfere with the freedom of movement of the brace rod. In order to lubricate the surfaces 54 and 55 and also the shaft 25 I have provided a lubricant duct 56 through the arm 41.

While I have illustrated what I consider to be the preferred form of my invention, it will be understood by those skilled in the art that various changes may be made in the minor details of construction, within the scope of the appended claims, and therefore I do not wish to be limited to the exact details shown and described.

Having thus described my invention what I claim is:—

1. In a motor vehicle, the combination with the frame and the axle, of a brake carrier supported on the axle, a brace rod connected at its forward end with the frame and pivoted at its rearward end to the brake carrier, and means connected with the brace rod intermediate its ends, adapted to resist the torque on the brake carrier.

2. In a motor vehicle, the combination with the frame and the axle, of a brake carrier supported on the axle, and a brace rod connected at its forward end to the frame and having its rearward end forked and pivoted to the brake carrier, said brake carrier having means extending between and engaging the forks of said brace rod, whereby the latter resists the turning action on the brake carrier.

3. In a motor vehicle, the combination with the frame and the axle, said axle having a transverse pivot pin mounted thereon, of a brace rod connected at its forward end with the frame and having a forked rear end the arms of which engage said pivot pin, and means rigidly connecting said arms to hold them in definite spaced relation.

4. In a motor vehicle, the combination with the frame and the axle, said axle having a transverse pivot pin mounted thereon, of a brace rod connected at its forward end with the frame and having a forked rear end the arms of which engage said pivot pin, and a member formed integral with and connecting said arms at their extremities.

5. In a motor vehicle, the combination with the frame, the axle, the brake carrier, the brakes thereon, and the brace rod connected with the frame at its forward end and forked at its rear end to provide arms embracing the axle and pivoted to the brake carrier, of a member rigidly connecting the ends of said arms, and retracting springs secured to said bar and to the brakes.

6. In a motor vehicle, the combination with the frame and the axle, of a sleeve on the axle, a brace rod connected at its forward end with the frame and at its rearward end, by a substantially vertically arranged pivot, to said sleeve, and a connection between an intermediate part of said brace rod and the forward part of said sleeve which permits slight relative movement in a substantially horizontal plane and prevents rotation of the sleeve about the axle.

7. A brace rod for motor vehicles comprising a part adapted to be connected with the frame of the vehicle and formed with a longitudinal bearing, and a part adapted to be connected with the vehicle axle and formed with a longitudinal split collar portion, a sleeve arranged within the collar, a connecting bolt extending through said bearing and said sleeve, and means for clamping said collar on said sleeve.

8. A brace rod for motor vehicles comprising a part adapted to be connected with the frame of the vehicle and formed with a longitudinal bearing, and a part adapted to be connected with the vehicle axle and formed with a longitudinal split collar portion, a sleeve threaded into said collar and adjustable therein, a connecting bolt extending through said bearing and said sleeve, and means for clamping said collar on said sleeve.

9. A brace rod for motor vehicles comprising a part adapted to be connected with the frame of the vehicle and formed with a longitudinal bearing, and a part adapted to be connected with the vehicle axle and formed with a longitudinal split collar portion, a sleeve threaded into said collar and adjustable therein, a connecting bolt extending through said bearing and said sleeve, the bearing being arranged between the head of said bolt and said sleeve, a nut on the end of said bolt adapted to be adjusted to take up wear, and means for clamping said collar on the sleeve.

10. In a motor vehicle, the combination with the frame and the axle, of a brace rod having its forward end connected with the frame, a sleeve arranged on the axle and having forwardly and rearwardly extending arms, a brake anchored to one of said arms, means on the other of said arms for operating the brake, a pivotal connection between said brace rod and said sleeve, and a sliding connection between said brace rod and one of said arms.

11. In a motor vehicle, the combination with the frame and the axle, of a brace rod having its forward end connected with the frame, a sleeve arranged on the axle and having forwardly and rearwardly extending arms, a brake anchored to one of said arms, means on the other of said arms for operating the brake, a pivotal connection between the rearward end of said brace rod and said sleeve and a sliding connection between an intermediate part of said brace rod and said forwardly extending arm.

12. In a motor vehicle, the combination with the frame and the axle, of a brace rod having its forward end connected with the frame, a sleeve arranged on the axle and having forwardly and rearwardly extending arms, a brake anchored to one of said arms, means on the other of said arms extending transversely through the brace rod for operating the brake, and a pivot bolt arranged transversely of the axle and brace rod connecting said brace rod with the sleeve, said brace rod engaging said forwardly extending arm at said means for resisting the rotating tendency of the brake.

13. In a motor vehicle, the combination with the frame and the axle, of a brace rod connected at one end to the frame, a brake carrier arranged on the axle, a brake supported on said carrier, a pivotal connection between said brace rod and said carrier, and a retracting spring for said brake connected with said brace rod.

14. In a motor vehicle, the combination with the frame and the axle of a brace rod connected at one end with the frame, a brake carrier arranged on the axle, a brake supported on said carrier, a pivotal connection between the other end of said brace rod and said carrier adjacent the axle, and a retracting spring for said brake connected with the axle end of said brace rod.

15. In a motor vehicle, the combination with the frame and an axle, the axle carrying a brake supporting part and a part rigid with said brake supporting part and extending forwardly from the axle, of a frame and axle connecting member connected at its forward end with the frame and pivotally connected at its rearward end to a part rigid with said brake supporting part, and a connection between said connecting member and said forwardly extending part permitting slight relative movement in a substantially horizontal plane while preventing rotation of said parts with the vehicle wheels, when the brake is applied.

16. In a motor vehicle, the combination with the frame and an axle, the axle carrying a brake supporting part and a part rigid with said brake supporting part and extending forwardly from the axle, of a frame and axle connecting member connected at its forward end with the frame by a universal joint and pivotally connected at its rearward end to a part rigid with said brake supporting part, and a connection between said connecting member and said forwardly extending part permitting slight relative movement in a substantially horizontal plane while preventing rotation of said parts with the vehicle wheels when the brake is applied.

17. In a motor vehicle, the combination with the frame, a non-rotating axle, a wheel mounted at the end of the axle and carrying a brake drum, a brake-supporting part carried by the axle adjacent the wheel, and a part rigid with the brake supporting part and extending forwardly from the axle, of a frame and axle connecting member connected at its forward end with the frame and pivotally connected at its rearward end to a part rigid with said brake-supporting part, and a connection between said connecting member and said forwardly extending part permitting relative movement laterally of the vehicle but preventing said parts from rotating with the wheel when the brake is applied.

18. In a motor vehicle, the combination with the frame, a non-rotating axle, a wheel mounted at the end of the axle and carrying a brake drum, a brake-supporting part carried by the axle adjacent the wheel, and a part rigid with the brake supporting part and extending forwardly from the axle, of a frame and axle connecting member connected at its forward end with the frame and having a pivotal connection, at its rearward end to a part rigid with said brake-supporting part, said connection being in a vertical plane, extending longitudinally of the vehicle, and a connection between said connecting member and said forwardly extending part permitting relative movement laterally of the vehicle but preventing said parts from rotating with the wheel when the brake is applied.

19. In a motor vehicle, the combination with the frame, a non-rotating axle, a wheel mounted at the end of the axle and carrying a brake drum, a brake-supporting part carried by the axle adjacent the wheel, and a part rigid with the brake supporting part and extending forwardly from the axle, of a frame and axle connecting member connected at its forward end with the frame by a universal joint and having a pivotal connection at its rearward end to a part rigid with said brake-supporting part, said connection being in a vertical plane extending longitudinally of the vehicle, and a connection between said connecting member and said forwardly extending part permitting relative movement laterally of the vehicle but preventing said parts from rotating with the wheel when the brake is applied.

In testimony whereof I affix my signature in presence of two witnesses.

HAROLD D. CHURCH.

Witnesses:
J. L. BLAKESLEE,
C. E. BROAD.

Copies of this patent may be obtained for five cents each, by addressing the "Commissioner of Patents, Washington, D. C."